United States Patent [19]

Jacquelin

[11] 4,112,409
[45] Sep. 5, 1978

[54] ELECTROLYTIC RESISTOR

[75] Inventor: Jean Jacquelin, Marolles en Hurepois, France

[73] Assignee: Compagnie Generale d'Electricite S.A., France

[21] Appl. No.: 743,256

[22] Filed: Nov. 19, 1976

[30] Foreign Application Priority Data

Dec. 3, 1975 [FR] France .............................. 75 36968

[51] Int. Cl.² ............................................ H01C 10/02
[52] U.S. Cl. ..................................................... 338/222
[58] Field of Search ..................... 338/222, 44, 27, 38, 338/56, 80, 94, 151; 361/327

[56] References Cited

U.S. PATENT DOCUMENTS

| 2,713,726 | 7/1955 | Dixson | 338/44 X |
| 2,855,545 | 10/1958 | Beyrard | 338/56 X |
| 2,890,430 | 6/1959 | Cid | 338/44 |
| 3,208,023 | 9/1965 | Poyle | 338/222 X |

FOREIGN PATENT DOCUMENTS 134,865 11/1919 United Kingdom ...................... 338/38

Primary Examiner—C. L. Albritton
Attorney, Agent, or Firm—Sughrue, Rothwell, Mion, Zinn and Macpeak

[57] ABSTRACT

The invention relates to an electrolytic resistor comprising a water-repellent insulating tube through which there flows an alkaline solution containing a suspension of zinc. The positive end of the resistor has a metallic grid suitable for trapping the zinc particles, and the negative end has either an air electrode or a ring made of a metal having, more especially, high hydrogen supertension, this ring itself possibly having holes or projections suitable for promoting the progressive deposition of zinc dendrites. The invention is used in zinc-air storage cells.

15 Claims, 7 Drawing Figures

ELECTROLYTIC RESISTOR

FIELD OF THE INVENTION

The present invention relates to an electrolytic resistor for use with an alkaline electrolyte containing a metal in a suspension.

BACKGROUND OF THE INVENTION

Electrolytic resistors are well-known in the field of electrochemistry and are subject to Ohm's law like ordinary resistors, i.e. the rated value of their resistance depends on the length, the cross-section and the resistivity of their constituent material (i.e. the electrolyte).

However, while operation of these resistors does not present any particular problem with conventional electrolytes, their operation using some alkaline solutions presents drawbacks of an electrochemical kind which may arise to disturb or even interrupt the operation.

To give a clear idea, in the particular case of an electrolyte which is an aqueous alkaline solution containing zinc particles in suspension as well as zincates in solution, defects such as adhesion of zinc deposits, evolution of gas and corrosion disturb the operation of the resistor and may even constitute an appreciable fire hazard or explosion risk.

Preferred embodiments of the present invention make it possible to avoid such hazards and provide resistors which are regular and reliable in operation.

SUMMARY OF THE INVENTION

The invention therefore relates to an electrolytic resistor comprising a tube made of an electrically insulative material for containing a flow of an alkaline aqueous solution including a metal in suspension and a hydropide of said metal in solution, wherein the positive end of said electrolytic resistor comprises a grid made of a conductive material capable of retaining particles of said metal in suspension and the negative end of said resistor comprises an inner porous insulator and hydrophilous separator layer, an intermediate electrode layer capable of consuming oxygen in the air and of producing hydroxide ions therefrom and an outer conductive grid layer.

According to one embodiment, the negative end of said resistor comprises a conductive material having a high hydrogen overpressure and free from inclusions of elements which are liable to form intermetallic compounds with said metal in suspension so that particles of metal are deposited on its surface by electrolysis of said hydroxide then are separated and drawn away by said alkaline solution.

This metal can be e.g. magnesium.

Embodiments of the invention are described by way of example with reference to the accompanying drawings.

DESCRIPTION OF PREFERRED EMBODIMENTS

Figure 1:
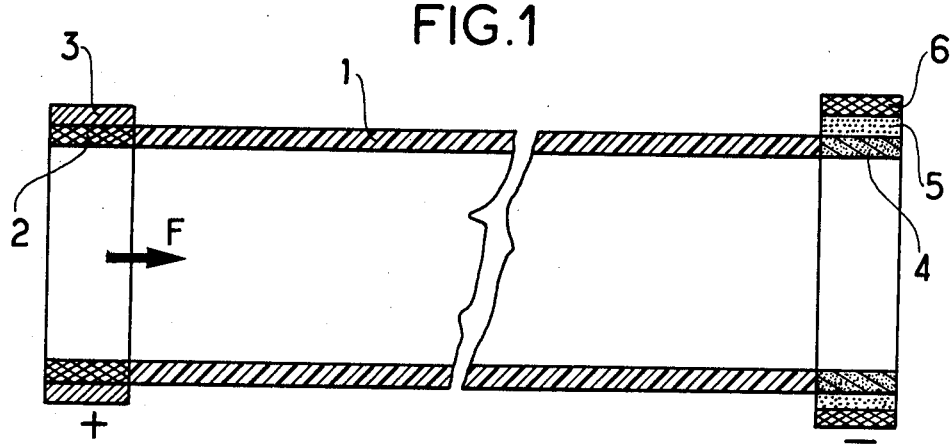
FIG. 1 is a longitudinal sectional view of a first embodiment of an electrolytic resistor according to the invention.

In FIG. 1, an electrolytic resistor according to the invention comprises a tube 1 made of an insulative material. The positive end of the resistor is formed by a grid 2 made of a metal capable of withstanding the electrolyte and is surrounded by a sleeve 3.

The negative end of the resistor is formed of successive layers which, going from the inside towards the outside, comprise a porous insulator and hydrophilous separator 4 made of asbestos ceramics or plastics material an "air" electrode 5 and lastly a grid 6.

The electrolyte which is an alkaline aqueous solution containing particles of zinc in suspension as well as hydroxide or zincate in solution flows in the direction shown by the arrow F, but can of course flow in the opposite direction.

The following electrochemical phenomena occur in such a resistor:

The $OH^-$ ions of the electrolyte which migrate towards the positive end oxidize the zinc particles retained by the grid 2 to produce a zincate. This prevents any evolution of oxygen at the positive end and thus any resulting corrosion.

At the negative end, the "air" electrode 5 consumes oxygen in the air, thus forming $OH^-$ ions. It should be that if the $OH^-$ ions were not formed in this way, they would be formed by electrolysis of the zincate in the electrolyte and zinc deposits would occur at this end, thus obstructing the tube 1 and provoking dangerous evolution of hydrogen. It should also be observed that the tube 1 is made of a water-repellent material such as polytetrafluoroethylene, or "Teflon". Thus the continuous film of electrolyte otherwise cover the walls of the tube breaks down due to the water-repellent effect of the wall, and deterioration of the insulator because of the heating effect of electric current passing through the film is thereby avoided.

Of course the tube 1 can be made of an electrically insulative material coated internally with a layer of Teflon.

Likewise, only a part of said tube delimited by two transveral cross-sections perpendicular to the axis need be made of Teflon. In the embodiments which are described hereinbelow, both the positive end of the tube 1 and the tube itself are made as has just been described.

Figure 2:
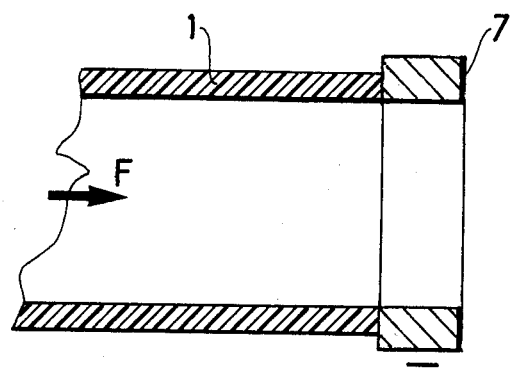
FIG. 2 is a sectional view, of a portion of a second embodiment of an electrolytic resistor according to the invention.

In FIG. 2, the negative end is formed by a ring 7 advantageously made of a material having a high hydrogen overpressure, e.g. a material based on magnesium. In this way, zinc particles or dendrites are deposited on its surface by electrolysis of the zincate in the solution and are then swept away by the flow of electrolyte.

Of course such a material must form intermetallic compounds with zinc.

For this reason, it is desirable to avoid in this material inclusions of elements such as: copper, nickel, iron, or zinc.

It is also desirable for the inside surface of the ring 7 to be polished. Advantageously, this surface is also partitioned or compartmented into metallic zones and insulating zones.

Such partitioning can be effected on a microscopic scale for example by covering the metal surface with a layer of insulatine oxide which is broken or cracked by thermal treatment. In this way, zinc dendrites are deposited on the breaks; their base is very small and is very fragile, this making it easy to for the electrolyte flow F to seat tear away.

The partitioning can also be effected on the macroscopic scale. For this purpose, grooves which are filled with an insulative material such as an epoxy resin are formed on the inside surface of the ring 7. Then the ring is polished, thereby forming a plurality of small metallic divisions separated by an insulator. The dentrites are again deposited on the metallic divisions and such a deposit is also easy to separate from the ring 7.

Figure 3:
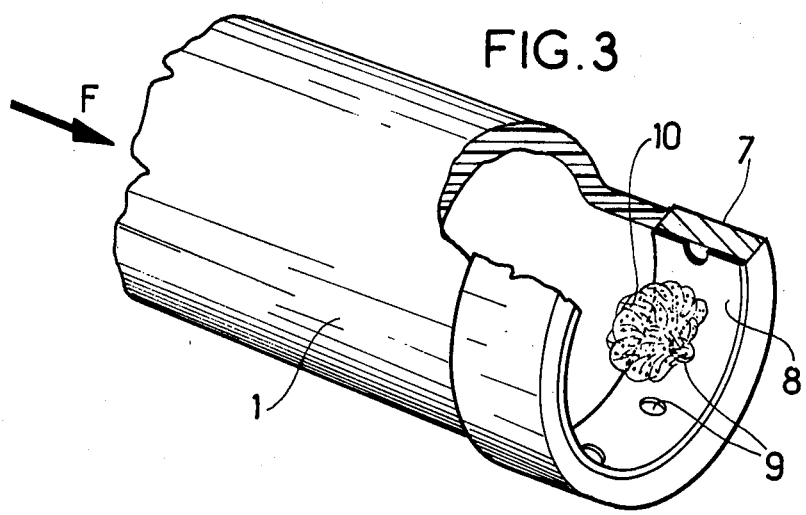
FIG. 3 is a perspective view, partially broken away, of a portion of a third embodiment of an electrolytic resistor according to the invention.

In the embodiment illustrated in FIG. 3, the ring 7 is covered on its inside surface with an insulating layer 8 pierced by small holes 9.

In this way, the zinc dendrites grow in the holes 9 and spread as shown at 10, i.e. they have a thin base in the holes 9 ending in a bushy top portion such as shown. Such a spread results in a high shearing force at their base and easy separation from the ring 7 by the flow of solution.

Figure 4A:
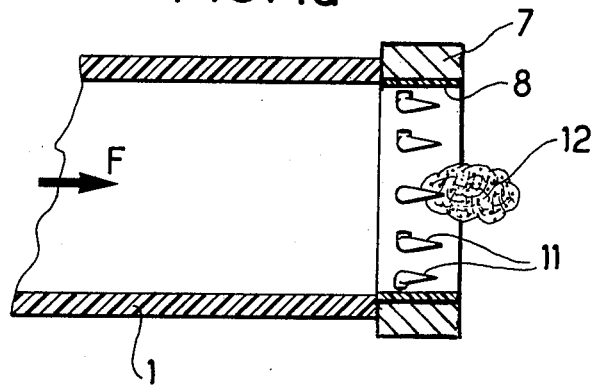
FIGS. 4a and 4b are sectional views of portions of a fourth of an electrolytic resistor according to the invention.
Figure 4B:
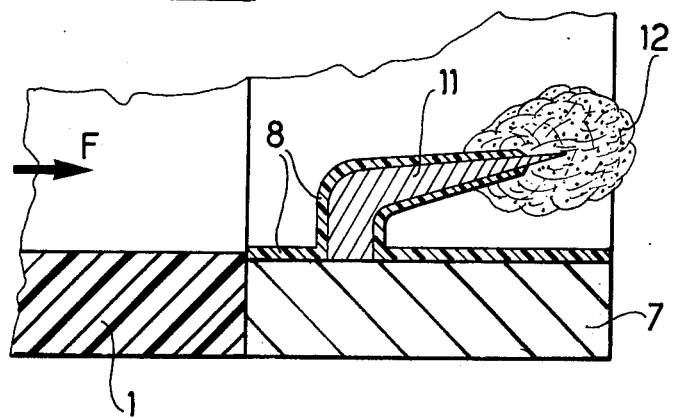

In the embodiment shown in FIGS. 4a and 4b, the ring 7 is still covered with an insulative layer 8.

It will be seen that projections 11 of the same material as the ring 7 have been disposed on its inner surface. These projections end in a point and are covered except at the point with the insulating layer 8. As can be seen, the points of the projection 11 point in parallel directions along the direction of flow of the solution F.

It will be seen in the figures that the zinc dendrites spread out at the end of such growths as shown at 12.

Figure 5A:
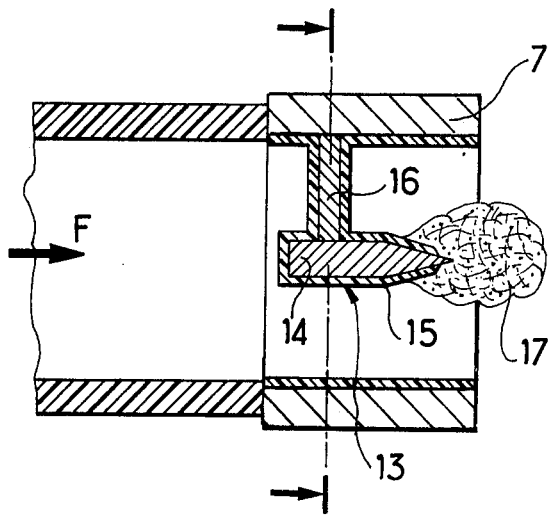
FIGS. 5a and 5b are longitudinal and transverse sections of a fifth embodiment of an electrolytic resistor according to the invention.
Figure 5B:
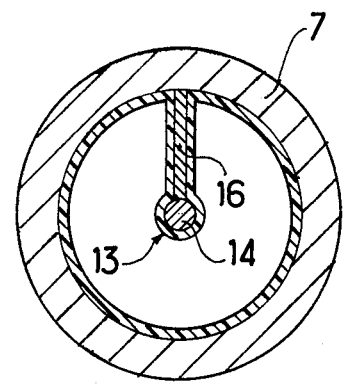

In the embodiment shown in FIGS. 5a and 5b, a part 13 disposed at the axis of the tube 1 is connected to the ring 7. This part has a metallic core 14 which is for example cylindrical, ending in a conical point and is covered except at the end of the point with an insulating layer 15. This metal core 14 is made integral with an electric conductor 16 which is also insulated and is itself connected to the ring 7. As previously, the conical point lies parallel to the direction of flow F of electrolyte.

A preferred embodiment of the invention is described hereinbelow.

The resistor has a value of 50 ohms at 45° C and ensures a hydraulic discharge of several cu. m. per hour.

The tube 1 is made of Teflon and has a length of 1m and a diameter of 20 mm.

The form of embodiment shown in FIG. 1 has been chosen.

Consequently the grid 2 is made of copper-coated iron as is the sleeve 3.

The separator 4 is made of porous asbestos, the electrode 5 is made of porous active carbon, the grid 6 is made of a conductive material and porous Teflon.

The electrolyte is a 12N aqueous solution of potassium hydroxide containing zinc particles in a suspension.

Such a resistor makes it possible for the electrolyte to pass from any potential which is different by 100 volts, e.g. U±100 volts, the current being 2 amperes.

Whatever the embodiment chosen, an electrolytic resistor according to the invention is capable of making the potential of a solution very even within wide limits without there being any danger of blocking, explosion and the like such as mentioned hereinabove.

Of course, such resistors can be interconnected in series or in parallel.

Particularly advantageous applications for the invention are found in the field of air-zinc storage cells for electric vehicles.

Of course, the invention is in no way limited to the embodiments described and illustrated, which have been given only by way of example. In particular, without going beyond the scope of the invention, details can be modified, some arrangements can be changed or some means can be replaced by equivalent means. For example, it is possible for the tube 1 not to be rectilinear but to be curved or bent, or constituted by a succession of short straight tubes connected together by angled parts.

What we claim is:

1. An electrolytic resistor of the type containing a flow of an alkaline aqueous solution including a metal in suspension and a hydroxide of said metal in solution, said resistor comprising a tube made of an electrically insulative material for containing said flow, the positive end of said electrolytic resistor comprising a grid made of a conductive material capable of retaining particles of said metal in suspension and the negative end of said resistor comprising an inner porous insulator and hydrophilous separator layer, an intermediate electrode layer capable of consuming oxygen in the air and of producing hydroxide ions therefrom, and an outer conductive grid layer.

2. An electrolytic resistor having a tube made of an electrically insulating material and containing a flow of an alkaline aqueous solution including a metal in suspension and a hydroxide of said metal in solution, the positive end of said electrolytic resistor comprising a grid made of a conductive material which is capable of retaining particles of said metal in suspension and the negative end of said resistor comprising a conductive material having a conductive material having a high hydrogen overpressure and free from inclusions of elements which are liable to form intermetallic compounds with said metal in suspension so that particles of metal are deposited on its surface by electrolysis of said hydroxide and are then separated and drawn away by flow of said alkaline solution.

3. A resistor according to claim 2, wherein said conductive material contains magnesium.

4. A resistor according to claim 2, wherein the inner surface of said negative end is polished.

5. A resistor according to claim 2, wherein the inner surface of said negative end is partitioned into conductive zones and insulative zones.

6. A resistor according to claim 5, wherein said partitioning is formed by a layer of cracked insulating material.

7. A resistor according to claim 5, wherein said partitioning is formed by grooves in which is disposed an insulating material.

8. A resistor according to claim 2, wherein said negative end is covered on its inside surface with an insulating layer having holes formed therethrough.

9. A resistor according to claim 2, wherein said negative end has projections preferably made of the same material, said projections each ending in a point lying parallel and facing the same way as the flow of said alkaline solution within said tube, said negative end being covered with an insulating layer and said projections being likewise covered with an insulating layer except for the tips of the points.

10. A resistor according to claim 2, wherein said negative end includes a part disposed at the axis of the tube, said part having a core preferably made of the same material as the negative end and terminating in a point lying parallel to and in the same direction as the flow of said alkaline solution in said tube, said part being integral with an electric conductor and connected to said negative end by said conductor, and said negative end, said electric conductor and said part being covered with an insulating layer except for the tip of the point of said part.

11. A resistor according to claim 1, wherein said tube is entirely made of a water-repellent material.

12. A resistor according to claim 1, wherein said tube is made of an insulating material internally coated with a water-repellent material.

13. A resistor according to claim 1, wherein a portion of said tube delimited by two transversal cross-sections perpendicular to its axis is made of a water-repellent material, the remaining portion being made of an insulating material.

14. A resistor according to claim 11, wherein said water-repellent material contains polytetrafluoroethylene.

15. A resistor according to claim 1, wherein said metal in a suspension is zinc.

* * * * *